United States Patent
Robitaille et al.

(10) Patent No.: US 9,762,469 B2
(45) Date of Patent: *Sep. 12, 2017

(54) METHOD FOR DEVICES IN A NETWORK TO PARTICIPATE IN AN END-TO-END MEASUREMENT OF LATENCY

(71) Applicant: Accedian Networks Inc., St-Laurent (CA)

(72) Inventors: Claude Robitaille, St-Placide (CA); Pierre Trudeau, Lorraine (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,508

(22) Filed: Jun. 10, 2015

(65) Prior Publication Data
US 2015/0281030 A1   Oct. 1, 2015

Related U.S. Application Data

(63) Continuation of application No. 14/151,763, filed on Aug. 5, 2014, now Pat. No. 9,088,492, which is a
(Continued)

(51) Int. Cl.
*H04L 12/26* (2006.01)
*H04J 3/14* (2006.01)
*H04B 17/00* (2015.01)

(52) U.S. Cl.
CPC ......... *H04L 43/0864* (2013.01); *H04B 17/00* (2013.01); *H04J 3/14* (2013.01);
(Continued)

(58) Field of Classification Search
CPC ......... H04L 43/00; H04L 43/50; H04L 43/10; H04L 43/106; H04L 43/0864; H04B 17/00; H04J 3/14
See application file for complete search history.

(56) References Cited

U.S. PATENT DOCUMENTS 6,535,983 B1   3/2003   McCormack et al.
6,545,979 B1   4/2003   Poulin
(Continued)

FOREIGN PATENT DOCUMENTS

EP   1215559   6/2002
JP   S6113414 A   1/1986
(Continued)

OTHER PUBLICATIONS

Atushi Otha, "Introduction of detail mechanism of Ether OAM," The Institution of Electronics, Information and Communication Engineers Technical Report, CS2004-79-87 [Communication System], The Institution of Electronics, Information and Communication Engineers, Oct. 21, 2004, vol. 104, No. 380, pp. 35-40.
(Continued)

*Primary Examiner* — Ian N Moore
*Assistant Examiner* — Mewale Ambaye
(74) *Attorney, Agent, or Firm* — Nixon Peabody LLP

(57) ABSTRACT

A method of determining the latency of path segments in a communication network that uses multi-bit data packets comprises generating a test packet for use in determining the latency of path segments in the network; transmitting the test packet from a first device coupled to the network; storing in the test packet the time when a preselected bit in the test packet is transmitted from the first device; when the test packet is received by a second device coupled to the network, storing in the second device at least one of (a) the time when a preselected bit in the test packet is received by the second device and (b) the difference between (i) the time when the preselected bit in the test packet is transmitted from the first device and (ii) the time when the test packet is received by the second device.

2 Claims, 6 Drawing Sheets

Related U.S. Application Data continuation of application No. 13/542,449, filed on Jul. 5, 2012, now Pat. No. 8,830,860.

(52) U.S. Cl.
CPC ........ *H04L 12/2657* (2013.01); *H04L 43/062* (2013.01); *H04L 43/0852* (2013.01); *H04L 43/0858* (2013.01); *H04L 43/10* (2013.01); *H04L 43/106* (2013.01)

(56) References Cited

U.S. PATENT DOCUMENTS

| | | | |
|---|---|---|---|
| 6,604,136 | B1 | 8/2003 | Chang et al. |
| 6,715,087 | B1 | 3/2004 | Vergnaud et al. |
| 6,868,094 | B1 | 3/2005 | Bordonaro et al. |
| 7,113,485 | B2 | 9/2006 | Bruckman |
| 7,114,091 | B2 | 9/2006 | Vrancic |
| 7,242,693 | B1 | 7/2007 | Acharya et al. |
| 7,257,123 | B2 | 8/2007 | Choi et al. |
| 7,281,141 | B2 | 10/2007 | Elkayam et al. |
| 7,283,568 | B2 | 10/2007 | Robie, Jr. et al. |
| 7,286,482 | B2 | 10/2007 | Charcranoon |
| 7,310,664 | B1 | 12/2007 | Merchant et al. |
| 7,463,731 | B2 | 12/2008 | Beyda et al. |
| 7,478,251 | B1 | 1/2009 | Diab et al. |
| 7,519,006 | B1 | 4/2009 | Wing |
| 7,710,905 | B2 | 5/2010 | Dyck et al. |
| 7,787,438 | B2 | 8/2010 | Dowse |
| 7,873,057 | B2 | 1/2011 | Robitaille et al. |
| 7,936,700 | B2 | 5/2011 | Yamazaki et al. |
| 8,121,111 | B2 * | 2/2012 | Freiberger .......... H04L 43/0864 370/252 |
| 8,218,576 | B2 | 7/2012 | Hansson et al. |
| 8,705,341 | B2 | 4/2014 | Robitaille et al. |
| 2001/0000071 | A1 | 3/2001 | Nichols |
| 2003/0048754 | A1 | 3/2003 | Bruckman |
| 2003/0048811 | A1 | 3/2003 | Robie et al. |
| 2003/0091029 | A1 | 5/2003 | Jo et al. |
| 2003/0093513 | A1 | 5/2003 | Hicks et al. |
| 2003/0115321 | A1 * | 6/2003 | Edmison .................. H04L 1/20 709/224 |
| 2003/0115368 | A1 | 6/2003 | Wu |
| 2003/0219025 | A1 | 11/2003 | Choi et al. |
| 2004/0078483 | A1 | 4/2004 | Simila et al. |
| 2004/0105391 | A1 | 6/2004 | Charcranoon |
| 2004/0136713 | A1 | 7/2004 | Lim et al. |
| 2004/0164619 | A1 | 8/2004 | Parker et al. |
| 2004/0165595 | A1 | 8/2004 | Holmgren et al. |
| 2005/0078700 | A1 | 4/2005 | Thompson et al. |
| 2005/0099949 | A1 | 5/2005 | Mohan et al. |
| 2005/0099951 | A1 | 5/2005 | Mohan et al. |
| 2005/0099952 | A1 | 5/2005 | Mohan et al. |
| 2005/0144328 | A1 | 6/2005 | McBeath |
| 2005/0148314 | A1 | 7/2005 | Taglienti et al. |
| 2005/0271072 | A1 * | 12/2005 | Anderson .......... H04L 12/6418 370/419 |
| 2006/0051088 | A1 | 3/2006 | Lee et al. |
| 2007/0268850 | A1 | 11/2007 | Hansson et al. |
| 2007/0274227 | A1 * | 11/2007 | Rauscher .......... H04L 12/2697 370/252 |
| 2008/0005354 | A1 | 1/2008 | Kryskow, Jr. et al. |
| 2009/0046585 | A1 * | 2/2009 | Faraj .................. H04L 43/50 370/236 |
| 2009/0161569 | A1 | 6/2009 | Corlett |
| 2009/0190482 | A1 | 7/2009 | Blair |
| 2010/0195517 | A1 | 8/2010 | Kihara |
| 2010/0283682 | A1 | 11/2010 | Heidari-Bateni et al. |
| 2012/0134668 | A1 | 5/2012 | Freiberger |
| 2012/0218879 | A1 | 8/2012 | Robitaille et al. |
| 2012/0257641 | A1 | 10/2012 | Hansson et al. |
| 2013/0010600 | A1 | 1/2013 | Jocha et al. |
| 2013/0170388 | A1 | 7/2013 | Ito et al. |
| 2013/0322255 | A1 | 12/2013 | Dillon |
| 2014/0043992 | A1 | 2/2014 | Le Pallec et al. |

FOREIGN PATENT DOCUMENTS

| | | |
|---|---|---|
| JP | S2104339 A | 5/1987 |
| JP | 2002-026947 A | 1/2002 |
| JP | 2003-348119 A | 12/2003 |
| JP | 2004-200933 A | 7/2004 |
| WO | WO 2004/104080 | 12/2004 |
| WO | WO 2005/025013 | 3/2005 |
| WO | WO 2006/033611 | 3/2006 |
| WO | WO 2006/114687 | 11/2006 |
| WO | WO 2014/006484 | 1/2014 |

OTHER PUBLICATIONS

De Vito, L. et al. "One-Way Delay Measurement: State of the Art." IEEE Transactions on Instrumentation and Measurement. vol. 57, No. 12, Dec. 2008, pp. 2742-2750 (9 pages).

Fasbender, A. et al. "On Assessing Unidirectional Latencies in Packet-Switched Networks." IEEE International Conference on Communications. vol. 1, Jun. 8, 1997, pp. 490-494 (5 pages).

Hiroshi Ohta, "Standardication Status on OAM and QoS Issues for Carrier-Class Ethernet," The Institution of Electronics, Information and Communication Engineers Technical Report, CS2004-79-87 [Communication System], The Institution of Electronics, Information and Communication Engineers, Oct. 21, 2004, vol. 104, No. 380, pp. 29-34.

International Telecommunication Union, ITU-T, Y.1564, Series Y: Global Information Infrastructure, Internet Protocol Aspects and Next-Generation Networks, Mar. 2011 (38 pages).

International Telecommunication Union, ITU-T, G.8013/Y.1731, Series G: Transmission Systems and Media, Digital Systems and Networks, Jul. 2011 (92 pages).

Mills, D. et al. "Network Time Protocol Version 4: Protocol and Algorithms Specification." Internet Engineering Task Force. Jun. 2010 (220 pages).

Pezaros, D. et al. "Low-Overhead End-to-End Performance Measurement for Next Generation Networks." IEEE Transactions on Network and Service Management. vol. 8, No. 1, Mar. 2011, pp. 1-14 (14 pages).

Time Synchronization in Sensor Networks: A Survey, Sivrikaya et al., Jul.-Aug. 2004 (10 pages).

Sivrikaya, et al., "Time Synchronization in Sensor Networks: A Survey," Jul.-Aug. 2004, (10 pages).

International Search Report and Written Opinion mailed Dec. 6, 2005, which issued in International Patent Application No. PCT/SE2005/001307 (9 pages).

International Search Report, PCT/IB2006/001000, Nov. 14, 2006 (4 pages).

International Written Opinion, PCT/IB2006/001000, Nov. 14, 2006 (6 pages).

European Search Report mailed Sep. 27, 2013, which issued in European Patent Application No. 05779215.2 (6 pages).

International Search Report and Written Opinion mailed Nov. 25, 2013, which issued in corresponding International Patent Application No. PCT/IB2013/001432 (10 pages).

Supplementary European Search Report in corresponding European Patent Application No. 06744558.5-1853 (PCT/IB2006/001000), mailed Jul. 17, 2014 (15 pages).

* cited by examiner

METHOD FOR DEVICES IN A NETWORK TO PARTICIPATE IN AN END-TO-END MEASUREMENT OF LATENCY

This application is a continuation of and claims priority to U.S. patent application Ser. No. 14/451,763, filed Aug. 5, 2014, now issued as U.S. Pat. No. 9,088,492, which is a continuation of U.S. patent application Ser. No. 13/542,449, filed Jul. 5, 2012, now issued as U.S. Pat. No. 8,830,860, each of which is hereby incorporated by reference herein in its entirety.

FIELD OF THE INVENTION

This invention is directed towards creating a method for devices in a network to participate in an end-to-end measurement of latency and also determine segment by segment latency without additional messaging in the network.

BACKGROUND OF THE INVENTION

When an Ethernet circuit (or other type of circuit) is activated in a network, there is a need to be able to obtain precise performance measurements to make sure the circuit is fully functional in accordance with the performance specification of the operator. Unidirectional (1-way) and bi-directional (2-way) delay measurements are an essential performance measurement that needs to be obtained as part of the service activation. These measurements are also very useful to measure the performance of the Ethernet circuit while IN SERVICE.

These measurements, though useful, do not take into account the multiple segments that may exist within a network path and give no information to isolate the segment delay within the absolute path. To find such a segment over a multi-segment path requires numerous tests, excessive messaging and time.

There is a need to be able to discover a segment by segment latency along a path when an end-to-end latency measurement is requested and not increase messaging as a by-product of this segment by segment measurement.

An example of a unidirectional (1-way) measurement is illustrated in FIG. 1. When a unidirectional delay measurement is requested between network devices 101 and 102 along a network path 103, a test packet 104 is created and a timestamp 105 is inserted into the packet 104 denoting the time when the first bit of packet 104 is transmitted. When the packet 104 arrives at the network device 102, a second timestamp 106 is taken to denote the time when the last bit of the packet 104 arrives at the device 102. The difference in time between timestamp 105 and timestamp 106 denotes the delay in time to traverse the entire path between devices 101 and 102. All intermediate nodes between the devices are not deemed relevant. It is also to be noted that the clocks between the network devices must be precisely synchronized by one of the many methods known to one skilled in the art.

An example of a bi-directional (2-way) measurement is illustrated in FIG. 2. When a bi-directional delay measurement is requested between network devices 201 and 202 along a network path 203, a test packet 204 is created and a timestamp 205 is inserted into the packet 204 denoting the time when the first bit of the packet 204 is transmitted. When the packet 204 arrives at network device 202, a second timestamp 206 is taken to denote the time when the last bit of the packet 204 arrives at device 202. Then the addresses of the test packet 204 are modified and transmitted back to the device 201 containing the original timestamp 205, with the timestamp 206 and a timestamp 207 that denotes with the first bit of the packet 208 is transmitted on the network. When the final bit of the packet 208 arrives at the network device 201, a final timestamp 209 is taken. The difference in time between timestamp 205 and 206 ADDED to the difference in time between the timestamp 207 and 209 gives the total round-trip delay of the bi-directional path. Another method to determine the round-trip delay is to deduct the timestamp 205 from the timestamp 209. All intermediate nodes between the devices are not deemed relevant. It is also to be noted that the clocks between the network devices must be precisely synchronized by one of the many methods known to one skilled in the art.

SUMMARY OF THE INVENTION

In accordance with one embodiment, a method of determining the latency of path segments in a communication network that uses multi-bit data packets comprises generating a test packet for use in determining the latency of path segments in the network; transmitting the test packet from a first device coupled to the network; storing in the test packet the time when a preselected bit in the test packet is transmitted from the first device; when the test packet is received by a second device coupled to the network, storing in the second device at least one of (a) the time when a preselected bit in the test packet is received by the second device and (b) the difference between (i) the time when the preselected bit in the test packet is transmitted from the first device and (ii) the time when the test packet is received by the second device. In one implementation, the time when a preselected bit in the test packet is received by the second device is stored in the second device, and the latency of the path segment between the first and second devices is determined to be the difference between the two stored times. In another implementation, the difference between (i) the time when the preselected bit in the test packet is transmitted from the first device and (ii) the time when the test packet is received by the second device, is stored in the second device, and the latency of the path segment between the first and second devices is determined by retrieving the difference from the second device.

The test packet may be transmitted serially from the second device to a plurality of additional devices coupled to the network. Each time the test packet is received by one of the additional devices, the information stored in the additional device includes at least one of (a) the time when a preselected bit in the test packet is received by the additional device and (b) the difference between (i) the time when the preselected bit in the test packet is transmitted from the first device and (ii) the time when the test packet is received by the additional device. The test packet may also be returned from the second device to the first device, or from one of the additional devices to the first device via the same devices traversed by the test packet during transmission from the first device to the one additional device.

The test packet may be transmitted to and from the various devices while normal packets are being transported through the network.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

To allow the tracking of the delays of the individual segments of the end-to-end path of the circuit, a new field is defined within the packet that is used during the test. This new value stores the time stamp created when the first bit of the packet is transmitted for each segmented hop along the end-to-end path. This new value can be used by each device along the path to calculate the delay from the last device to itself, while preserving the information needed to determine the delay in the end-to-end path. This also allows devices that are not aware of this capability to operate normally. The intermediate hop devices can then be interrogated later to easily find the segment delay problem if the end-to-end path has an unacceptable delay measurement.

Figure 1:
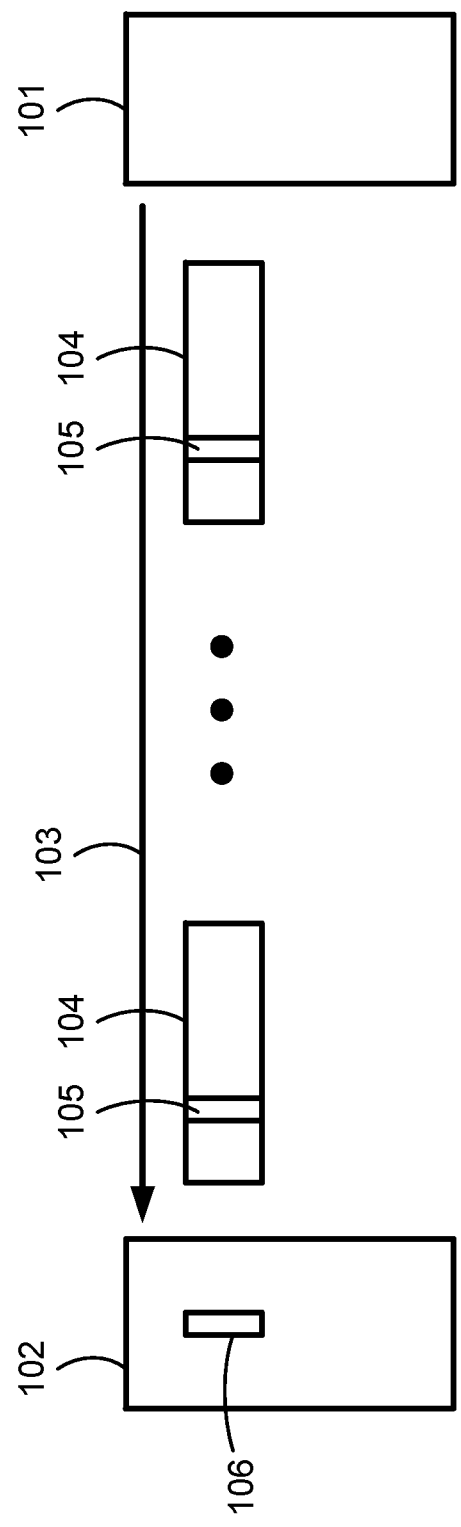
FIG. 1 is a diagrammatic illustration of a one-way latency measurement in a packet-based communication network.
Figure 2:
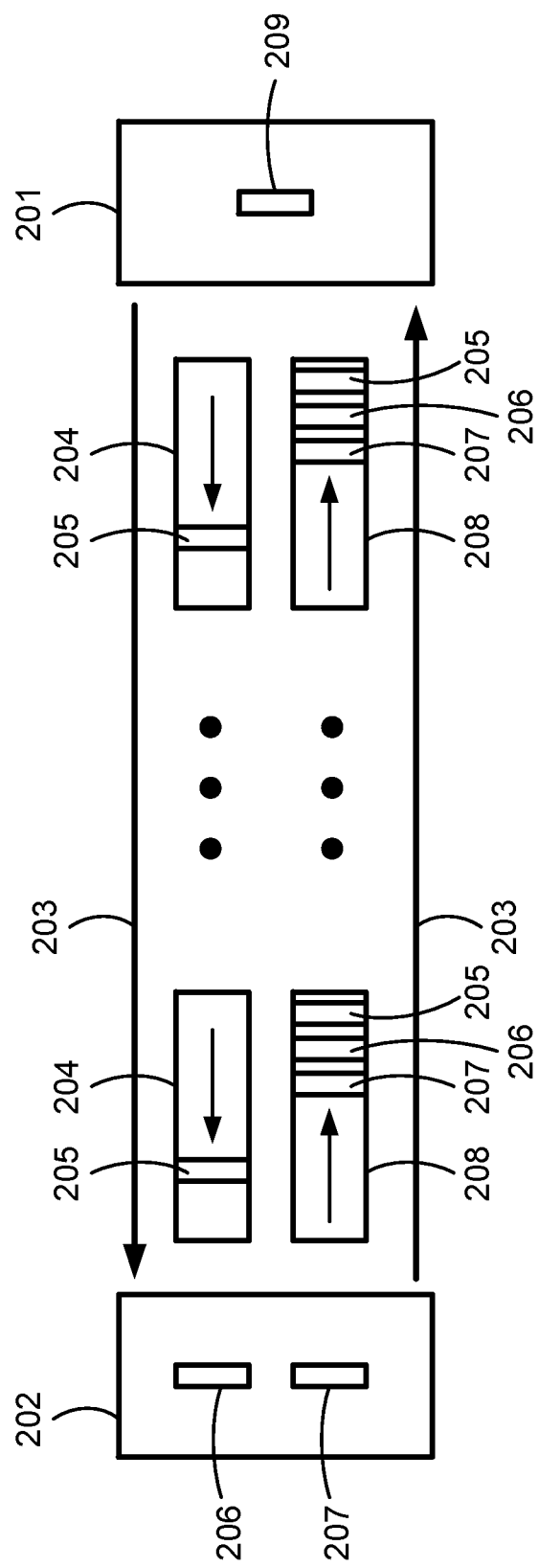
FIG. 2 is a diagrammatic illustration of a two-way latency measurement in a packet-based communication network.
Figure 3:
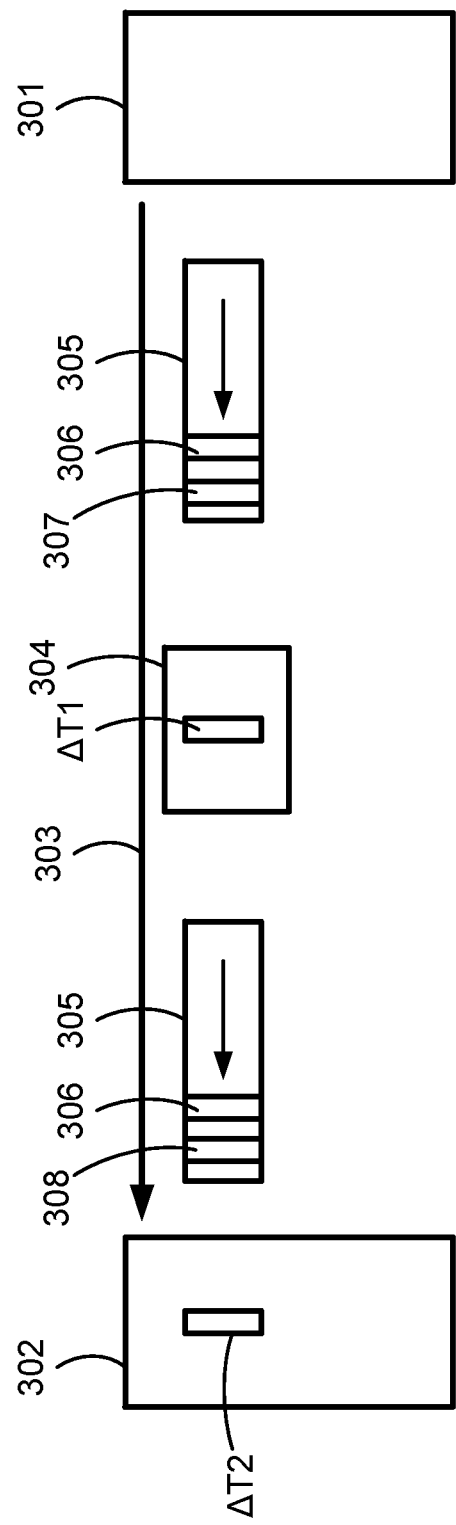
FIG. 3 is a diagrammatic illustration of one-way latency measurements for path segments, as well as the entire path, in a packet-based communication network.

FIG. 3 illustrates an example of a unidirectional (1-way) measurement. When a unidirectional delay measurement is requested between a pair of network devices 301 and 302 along a network path 303 that includes an intermediate network device 304, a test packet 305 is created and transmitted from the device 301 onto the path 303. A timestamp 306 is inserted into the packet 305 to denote the time when the first bit of the packet 305 is transmitted. A second timestamp field 307 is set at the same timestamp value, as this is the originating device.

The first network device to receive the packet 305 along the path 303 is the intermediate device 304. When the test packet 305 arrives at the device 304, the time difference $\Delta T1$ between the time when the last bit is received and the value in the timestamp 307 is calculated and stored in the network device 304. (Alternatively, the timestamp can be taken upon receiving the first bit of the packet 305.) This value $\Delta T1$ is the delay of the path segment from device 301 to device 304. A new timestamp 308, denoting the time when the first bit of the packet 305 is transmitted from the device 304, is taken and stored in the field where the timestamp 307 had been stored.

When the packet 305 arrives at the end-point device 302, the time when the last bit arrives is recorded in the device 302, and the time difference $\Delta T2$ between the timestamp 308 and the recorded time can be stored in the device 302 as the delay of the path segment from device 304 to device 302. The time difference between the arrival time stored in device 302 and the time stored in 306 is the value of the end-to-end delay in the path 303.

Figure 3A:
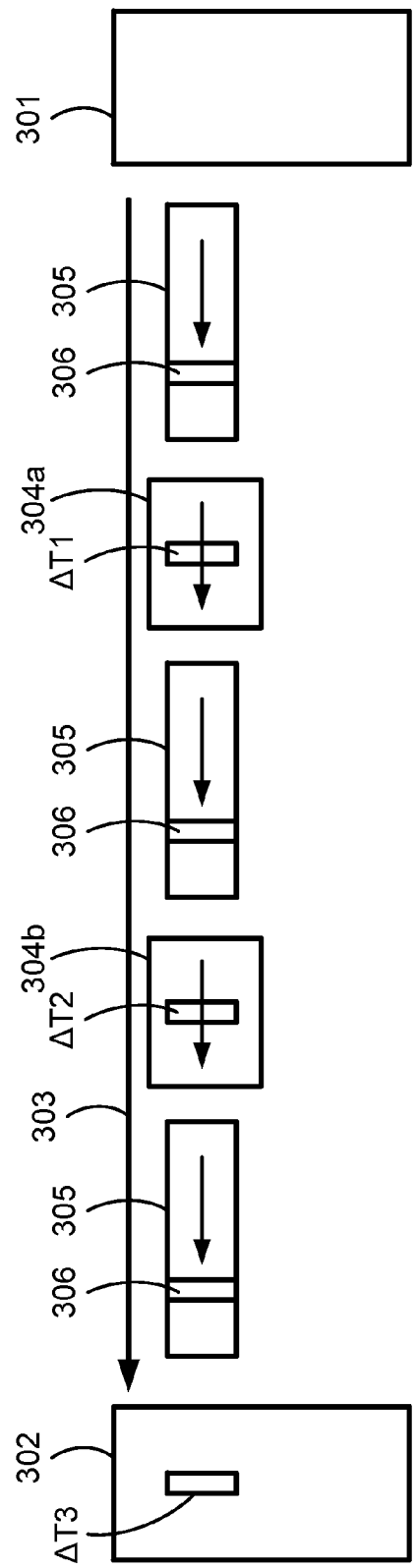
FIG. 3a is a diagrammatic illustration of modified one-way latency measurements for path segments, as well as the entire path, in a packet-based communication network.

FIG. 3a illustrates a modified embodiment of a unidirectional delay measurement made between network devices 301 and 302 along a network path 303 that includes two intermediate network devices 304a and 304b. A test packet 305 is created and transmitted from the first device 301 onto the path 303, and a timestamp 306 is inserted into the packet 305 denoting the time when the first bit of the packet is transmitted from the first device 301.

When the packet 305 arrives at the first intermediate device 304a, the time difference $\Delta T1$ between the time when the last bit is received by the device 304a and the time when the first bit was transmitted from the device 301 (the value in timestamp 306) is calculated and stored in the device 304a. This value $\Delta T1$ is the delay of the path segment from device 301 to device 304a. The test packet 305 is then forwarded to the next network device 304b in the test path.

When the packet 305 arrives at the third device 304b, the time difference $\Delta T2$ between the time when the last bit is received by the device 304b and the time when the first bit was transmitted from the device 301 (the value in timestamp 306) is calculated and stored in the device 304b. Alternatively, the timestamp can be taken upon receiving the first bit of the packet 305. The value $\Delta T2$ is the total delay of the path segments from device 301 to device 304b. The test packet 305 is then forwarded to the last network device 302 in the test path.

When the packet 305 arrives at the final device 302, the time difference $\Delta T3$ between the time when the last bit is received by the device 302 and the time when the first bit was transmitted from the device 301 (the value in timestamp 306) is calculated and stored in the device 302. This value is the total end-to-end delay of the path from device 301 to device 302. The stored time differences $\Delta T1$, $\Delta T2$ and $\Delta T3$ in the respective network devices 304a, 304b and 302 along the test path 303 can then be retrieved centrally by any of several well known techniques for retrieving data from distributed network devices.

Figure 4:
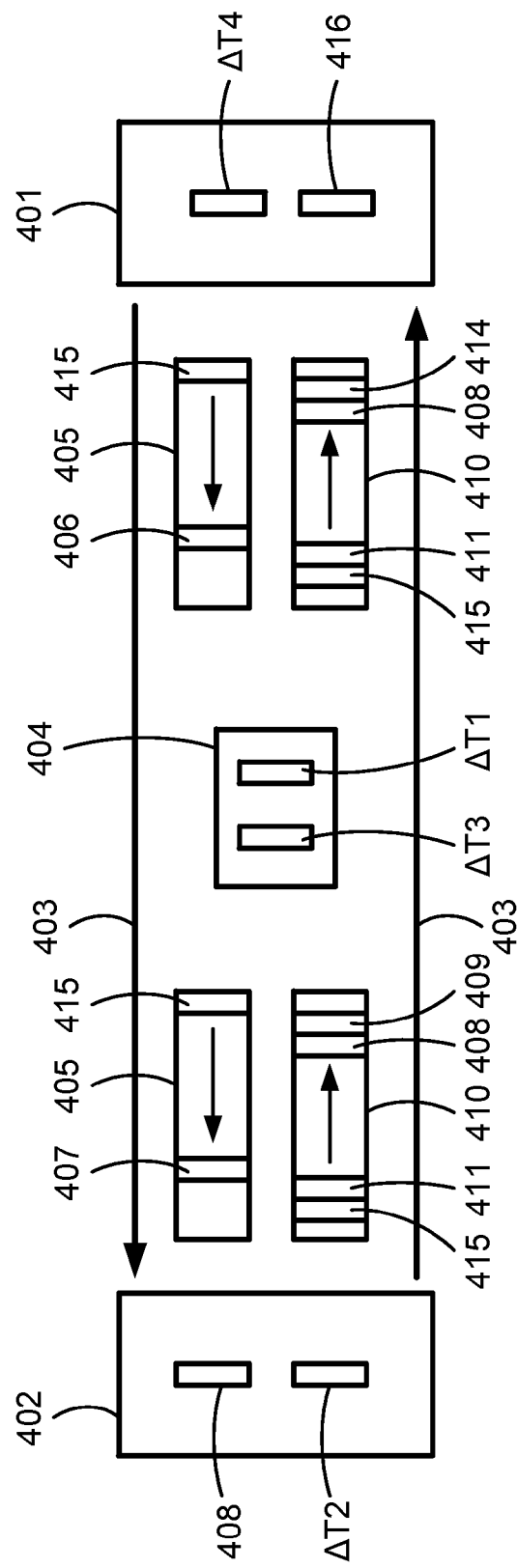
FIG. 4 is a diagrammatic illustration of two-way latency measurements for path segments, as well as the entire path, in a packet-based communication network.

In FIG. 4, when a bi-directional delay measurement is requested between network devices 401 and 402 along a network path 403, a test packet 405 is created and transmitted from the device 401 along the path 403. A timestamp 415 is inserted into the packet 405, denoting the time when the first bit of the packet 405 is transmitted. A second timestamp field 406 is set at the same value as the timestamp 415, as this is the originating device.

When the packet 405 arrives at an intermediate network device 404, the time difference $\Delta T1$ between the time when the last bit is received by the device 404 and the value in the timestamp 406 is calculated and stored in the device 404. This value $\Delta T1$ is the delay of the path segment from device 401 to device 404. A new timestamp 407, denoting the time when the first bit of the packet 405 is transmitted from the device 404, replaces the timestamp 406 previously stored in the packet 405.

When the packet 405 arrives at the third device 402, the time when the last bit in the packet 405 arrives at the device 402 is recorded in the device 402 as a timestamp 408. The time difference $\Delta T2$ between timestamp 408 and the time stored in timestamp 407 is calculated and stored in the device 402. This value $\Delta T2$ is the delay of the path segment from device 404 to device 402.

Next, the addresses of the original test packet 405 are reversed in a packet 410 that is transmitted in the reverse direction along the network path 403, from device 402 to device 401 via the intermediate device 404. The packet 410 still contains the original timestamp 415, the recorded timestamp 408 and new timestamps 409 and 411, both denoting the time when the first bit of the packet 410 is transmitted from the device 402.

When the packet 410 arrives at the intermediate network device 404, the time difference ΔT3 between the time when the last bit is received by the device 404 and the value in the timestamp 409 is calculated and stored in the device 404. This value ΔT3 is the delay of the path segment between from device 402 to device 404. A new timestamp 414, denoting the time when the first bit of the packet 415 is transmitted from the device 404 toward the device 401, replaces the timestamp 409 in the packet 410.

When the packet 410 arrives at the third device 401, which is the end point of the return path, the time when the last bit in the packet 410 arrives at the device 401 is recorded in the device 401 as a timestamp 416. The time difference ΔT4 between the recorded time 416 and the time stored in timestamp 414 is calculated and stored in the device 401. This value ΔT4 is the delay of the path segment between from device 404 to device 401.

Also, the difference in time between timestamp 415 and 408 ADDED to the difference in time between timestamp 411 and 416 gives the total round-trip delay of the bi-directional path. An alternative method to calculate the total round-trip delay is to deduct the timestamp 415 from timestamp 416. It is also to be noted that the clocks between the network devices must be precisely synchronized by one of the many methods known to one skilled in the art.

Figure 4A:
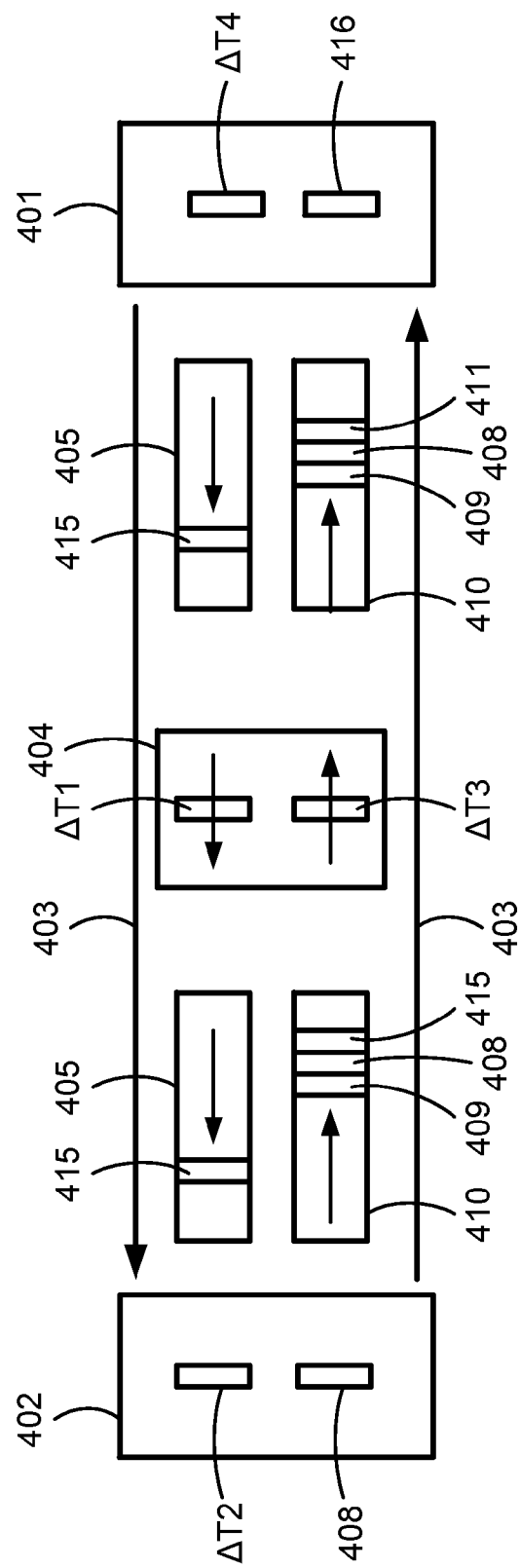
FIG. 4a is a diagrammatic illustration of modified two-way latency measurements for path segments, as well as the entire path, in a packet-based communication network.

In another embodiment illustrated in FIG. 4a, a two-way delay measurement is made between network devices 401 and 402 along a network path 403 that includes an intermediate network device 404. A test packet 405 is created at the first device 401, and a timestamp 415 is inserted into the packet 405 denoting the time when the first bit of the packet is transmitted from the first device 401. When the packet 405 arrives at the second device 404, the time difference ΔT1 between the time when the last bit is received by the device 404 and the time when the first bit was transmitted from the device 401 (the value in timestamp 415) is calculated and stored in the device 404. This value ΔT1 is the segment delay of the path segment from device 401 to device 404. The test packet 405 is then forwarded to the next network device 402 in the test path.

When the packet 405 arrives at the third device 402, the time difference ΔT2 between the time when the last bit is received by the device 402 (stored as timestamp 408) and the time when the first bit was transmitted from the device 401 (the value in timestamp 415) is calculated and stored in the device 402. The value ΔT2 is the total segment delay of the path segment from device 401 to device 402.

Then the addresses of the original test packet 405 are reversed in a packet 410 that is transmitted to the device 401 in the reverse direction along the network path 403. A timestamp 409 is inserted into the packet 410, denoting the time when the first bit of the packet is transmitted from the device 402 onto the return path. Timestamps 415 and 408 are also inserted into the packet. When the packet 410 arrives at the intermediate device 404, the time difference ΔT3 between the time when the last bit is received by the device 404 and the time when the first bit was transmitted from the device 402 (the value in timestamp 409) is calculated and stored in the device 404. This value ΔT3 is the delay of the path segment from device 402 to device 404. The test packet 410 is then forwarded to the network device 401, which is the end point of the path being tested.

When the packet 410 arrives at the device 401, the time difference ΔT4 between the time when the last bit is received by the device 401 (stored as timestamp 416 in device 401) and the time when the first bit was transmitted from the device 402 (the value in timestamp 409) is calculated and stored in the device 401. This value ΔT4 is the delay of the path from device 402 to device 401.

The stored time difference values ΔT1, ΔT2, ΔT3, and ΔT4 stored in the network devices 401, 402 and 404 along the test path can be retrieved centrally. It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Also, the difference in time between timestamp 415 and 408 ADDED to the difference in time between timestamp 409 and 416 gives the total round-trip delay of the bi-directional path. An alternative method to calculate the total round-trip delay is to deduct the timestamp 415 from timestamp 416. It is also to be noted that the clocks between the network devices must be precisely synchronized by one of the many methods known to one skilled in the art.

The invention claimed is:

1. A method of determining a round trip latency of a network path in a communication network having at least two path segments, that uses multi-bit data packets, said method comprising;
   generating a test packet;
   transmitting said test packet between first and second devices coupled to said network at opposite ends of a first path segment, and then between said second device and a third device coupled to opposite ends of a second path segment;
   returning said test packet to said first device by transmitting said test packet between said third and second devices and then between said second and first device;
   storing, in said test packet a first time corresponding to a transmission of a first preselected bit in said test packet from said first device;
   when said test packet is received by said second device coupled to said network, storing in said second device a second time when the preselected bit in said test packet is received by said second device;
   when said test packet is received by said third device coupled to said network, storing in said third device a third time when the preselected hit in said test packet is received by said third device; and
   determining the round trip latency of the network path after said test packet is returned to said first device; wherein the pre-selected bit is a first bit of the test packet used by each device along the path to compute the delay on each path segment while determining the round trip latency.

2. An apparatus for determining a round trip latency of a network path in a communication network, having at least two path segments comprising a first and second path segment, each having a first and second end, wherein said communication network uses multi-bit data packets, comprising:

a first network device at the first end of the first path segment being adapted to generate and transmit a test packet, wherein said test packet stores a first time corresponding to the transmission of a first preselected bit in said test packet;

a second network device at the second end of the first path segment and at the first end of the second path segment being adapted to receive said test packet from the first network device through the first path segment, store a second time when the preselected bit in said test packet is received from the first network device through the first path segment and transmit said test packet;

a third network device at the second end of the second path segment being adapted to receive said test packet from the second network device through the second path segment, store a third time when the preselected bit in said test packet is received from the second network device through the second path segment and transmit said test packet back to the second network device through the second path segment;

wherein the second network device is further adapted to receive the test packet from the third network device through the second path segment, store a fifth time when the preselected bit in said test packet is received from the third network device through the second path segment, and transmit the test packet back to the first network device;

wherein the first network device is further adapted to receive the test packet from the second network device through the first path segment, store a sixth time when the preselected bit in said test packet is received from the second network device through the first path segment and determine the round trip latency of the network path after said test packet is returned to said first device; wherein the pre-selected bit is a first bit of the test packet used by each device along the path to compute the delay on each path segment while determining the round trip latency.

\* \* \* \* \*

UNITED STATES PATENT AND TRADEMARK OFFICE
CERTIFICATE OF CORRECTION

| | | |
|---|---|---|
| PATENT NO. | : 9,762,469 B2 | Page 1 of 1 |
| APPLICATION NO. | : 14/735508 | |
| DATED | : September 12, 2017 | |
| INVENTOR(S) | : Claude Robitaille et al. | |

It is certified that error appears in the above-identified patent and that said Letters Patent is hereby corrected as shown below:

In the Claims

At Column 6, Line 54 (Claim 1, Line 23), after "preselected" delete "hit" and insert --bit-- therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*